(12) United States Patent  (10) Patent No.: US 6,564,749 B1
Dorsey  (45) Date of Patent: May 20, 2003

(54) PET RESTRAINING HARNESS SYSTEM

(76) Inventor: Ethel Dorsey, 4914 S. Laflin, Chicago, IL (US) 60609

( * ) Notice: Subject to any disclaimer, the term of this patent is extended or adjusted under 35 U.S.C. 154(b) by 0 days.

(21) Appl. No.: 09/928,087

(22) Filed: Aug. 10, 2001

(51) Int. Cl.⁷ .............................................. B60R 22/00
(52) U.S. Cl. ...................................... 119/771; 119/792
(58) Field of Search ................................ 119/771, 792; D30/152; 297/465, 467, 468; 182/3

(56) References Cited

U.S. PATENT DOCUMENTS

| 3,310,034 | A | * | 3/1967 | Dishart ........................ 119/771 |
| 4,483,275 | A | * | 11/1984 | De Groot .................... 119/793 |
| 4,676,198 | A | | 6/1987 | Murray |
| D293,139 | S | | 12/1987 | Roa |
| 4,817,562 | A | * | 4/1989 | Giroux ........................ 119/771 |
| 4,907,541 | A | | 3/1990 | Thompson |
| 4,970,991 | A | | 11/1990 | Luce |
| 5,154,660 | A | | 10/1992 | Snyder et al. |
| 5,379,725 | A | * | 1/1995 | Roberson et al. ........... 119/770 |
| 5,529,018 | A | | 6/1996 | Butts |
| 5,806,467 | A | * | 9/1998 | Arakawa ..................... 119/771 |
| 5,896,831 | A | * | 4/1999 | Alpert ......................... 119/792 |
| 6,161,505 | A | * | 12/2000 | Noguero ..................... 119/792 |

FOREIGN PATENT DOCUMENTS

EP  65509 A1 * 11/1982  .......... A01K/27/00

* cited by examiner

*Primary Examiner*—Charles T. Jordan
*Assistant Examiner*—Tara M Golba

(57) ABSTRACT

A pet restraining harness sytem for restraining a pet traveling in a vehicle having a seat belt with a buckle. The pet restraining harness sytem includes a retraint assembly including at least one restraint strap that has a first end and a second end. The restraint strap is positionable about the body of the pet with the ends being releasably couplable to each other. The restraint strap is releasably securable to the seat belt of the vehicle by a securing member that is mounted on the end of the restraint strap and which is releasably securable to the buckle of the seat belt in the vehicle.

1 Claim, 2 Drawing Sheets

US 6,564,749 B1

PET RESTRAINING HARNESS SYSTEM

BACKGROUND OF THE INVENTION

1. Field of the Invention

The present invention relates to pet harnesses and more particularly pertains to a new pet restraining harness sytem for restraining a pet traveling in a vehicle having a seat belt with a buckle.

2. Description of the Prior Art

The use of pet harnesses is known in the prior art. More specifically, pet harnesses heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,154,660; 4,907,541; 4,676,198; 4,970,991; 5,529,018; and U.S. Pat. No. Des. 293,139.

While these devices fulfill their respective, particular objectives and requirements, the aforementioned patents do not disclose a new pet restraining harness sytem. The inventive device includes a restraint assembly including at least one restraint strap that has a first end and a second end. The restraint strap is positionable about the body of the pet with the ends being releasably couplable to each other. The restraint strap is releasably securable to the seat belt of the vehicle by a securing member that is mounted on the second end of the restraint strap and releasably securable to the buckle of the seat belt in the vehicle.

In these respects, the pet restraining harness sytem according to the present invention substantially departs from the conventional concepts and designs of the prior art, and in so doing provides an system primarily developed for the purpose of restraining a pet traveling in a vehicle having a seat belt with a buckle.

SUMMARY OF THE INVENTION

In view of the foregoing disadvantages inherent in the known types of pet harnesses now present in the prior art, the present invention provides a new pet restraining harness sytem construction wherein the same can be utilized for restraining a pet traveling in a vehicle having a seat belt with a buckle.

The general purpose of the present invention, which will be described subsequently in greater detail, is to provide a new pet restraining harness sytem system and method which has many of the advantages of the pet harnesses mentioned heretofore and many novel features that result in a new pet restraining harness sytem which is not anticipated, rendered obvious, suggested, or even implied by any of the prior art pet harnesses, either alone or in any combination thereof.

To attain this, the present invention generally comprises a restraint assembly including at least one restraint strap that has a first end and a second end. The restraint strap is positionable about the body of the pet with the ends being releasably couplable to each other. The restraint strap is releasably securable to the seat belt of the vehicle by a securing member that is mounted on the second end of the restraint strap and releasably securable to the buckle of the seat belt in the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pet restraining harness sytem system and method which has many of the advantages of the pet harnesses mentioned heretofore and many novel features that result in a new pet restraining harness sytem which is not anticipated, rendered obvious, suggested, or even implied by any of the prior art pet harnesses, either alone or in any combination thereof.

It is another object of the present invention to provide a new pet restraining harness sytem which may be easily and efficiently manufactured and marketed.

It is a further object of the present invention to provide a new pet restraining harness sytem which is of a durable and reliable construction.

An even further object of the present invention is to provide a new pet restraining harness sytem which is susceptible of a low cost of manufacture with regard to both materials and labor, and which accordingly is then susceptible of low prices of sale to the consuming public, thereby making such pet restraining harness sytem economically available to the buying public.

Still yet another object of the present invention is to provide a new pet restraining harness sytem which provides in the systems and methods of the prior art some of the advantages thereof, while simultaneously overcoming some of the disadvantages normally associated therewith.

Still another object of the present invention is to provide a new pet restraining harness sytem for restraining a pet traveling in a vehicle having a seat belt with a buckle.

Yet another object of the present invention is to provide a new pet restraining harness sytem which includes a restraint assembly including at least one restraint strap that has a first end and a second end. The restraint strap is positionable about the body of the pet with the ends being releasably couplable to each other. The restraint strap is releasably securable to the seat belt of the vehicle by a securing member that is mounted on the second end of the restraint strap and releasably securable to the buckle of the seat belt in the vehicle.

Still yet another object of the present invention is to provide a new pet restraining harness sytem that restricts movement of a pet in the vehicle making transporting a pet more enjoyable.

Even still another object of the present invention is to provide a new safety belt for protecting a pet traveling in a vehicle that is involved in a collision. The pet is secured to the interior of the vehicle preventing the pet from being injured by being thrown about the interior of the vehicle or from being thrown from the vehicle. The present invention also protects a passenger traveling in the vehicle from being injured by a pet that is thrown about the interior of the vehicle These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
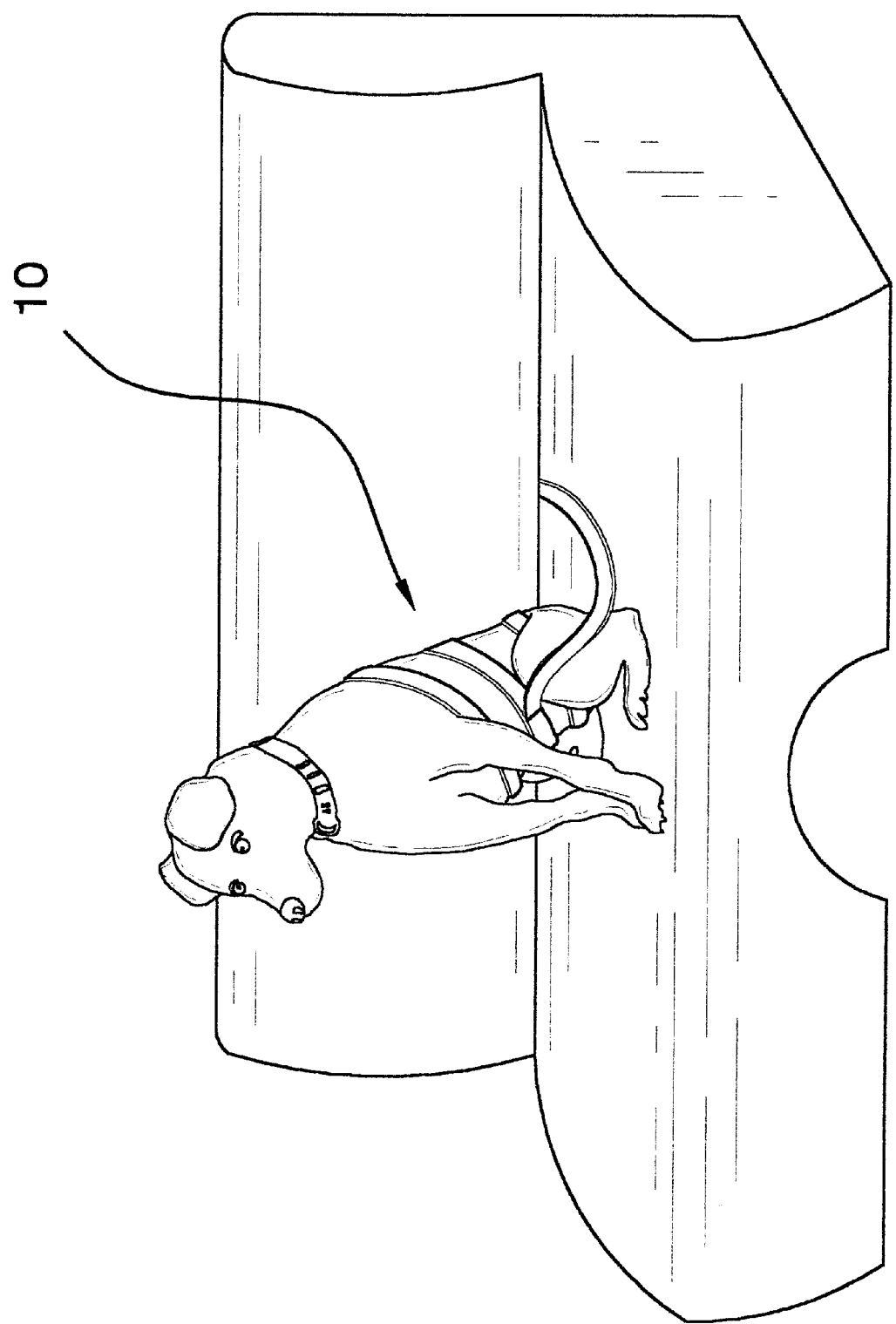
FIG. 1 is a schematic perspective view of a new pet restraining harness sytem according to the present invention.
Figure 2:
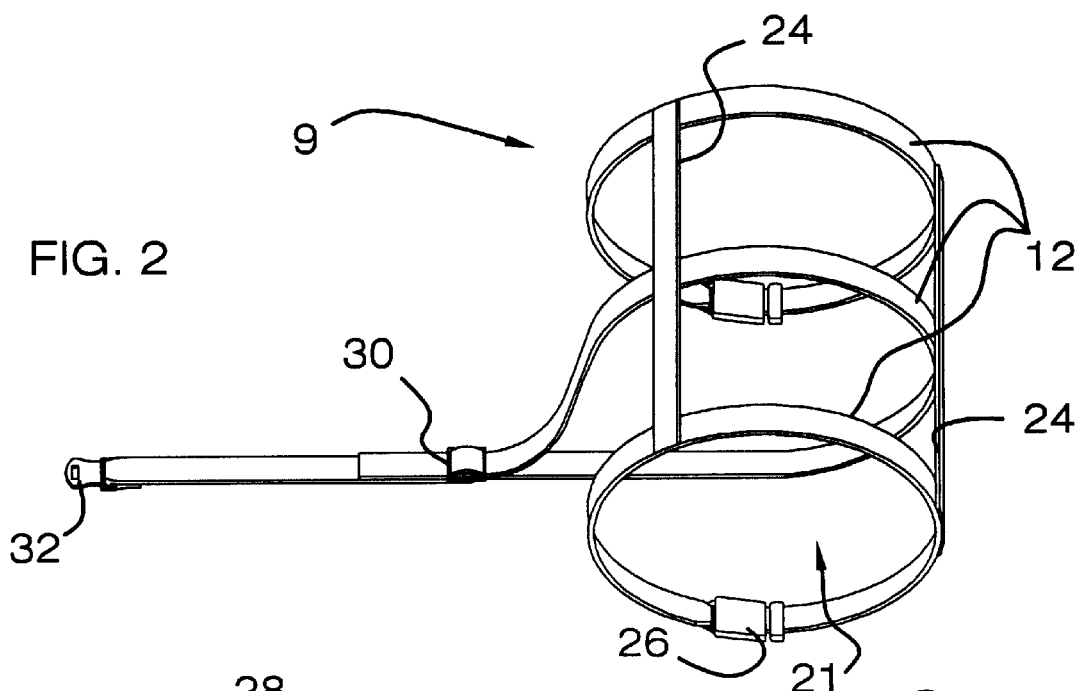
FIG. 2 is a schematic perspective view of the present invention.
Figure 3:
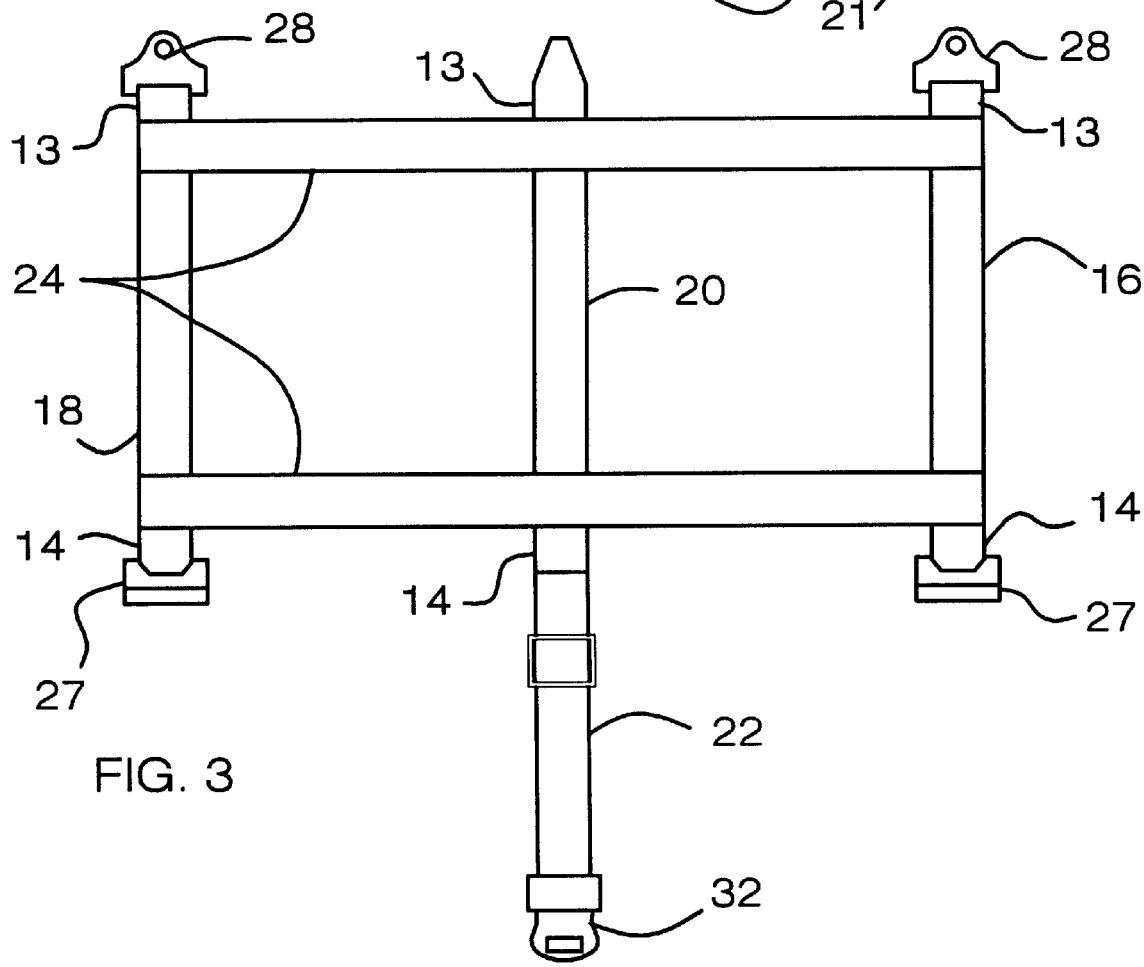
FIG. 3 is a schematic frontal view of the present invention.

With reference now to the drawings, and in particular to FIGS. 1 through 3 thereof, a new pet restraining harness sytem embodying the principles and concepts of the present invention and generally designated by the reference numeral 10 will be described.

As best illustrated in FIGS. 1 through 3, the pet restraining harness system 10 generally comprises a restraint assembly 9 that includes a plurality of restraint straps 12 that are removably couplable to a body portion of the pet and releasably couplable to the seat belt of the vehicle. Each of the restraint straps 12 includes a first end 13 and a second end 14 that are releasably couplable to each other such that each of the restraint straps 12 forms a loop that includes a hole 21 when the ends 13 and 14 are coupled together. Each of the holes 21 of the loops may be generally in registration with each other when the ends 13 and 14 of each of the restraint straps 12 are releasably coupled together for more easily positioning on the body of the pet.

In one embodiment of the present invention, the plurality of restraint straps 12 may include an upper restraint strap 16 that may be positionable about the body of the pet and positionable adjacent to a pair of fore legs of the pet. A lower restraint strap 18 may be positionable about the body of the pet and positionable adjacent to a pair of hind legs of the pet. The pet restraining harness 10 includes at least an intermediate restraint strap 20 that is positionable about the body of the pet and positionable at a location between the upper 16 and lower 18 restraint straps on the body of the pet. In an embodiment of the present invention not including an upper 16 and lower 18 restraint strap, the intermediate restraint strap 20 may be positionable about a midsection of the body of the pet.

In one embodiment of the present invention, the second end 14 of the intermediate restraint strap 20 extends beyond the first end of the intermediate restraint strap 20 defining a leader portion 22. The leader portion 22 preferably extends beyond the first end 13 of the intermediate restraint strap 20 when the intermediate restraint strap 20 is wrapped around the body of the pet. The first end 13 of the intermediate restraint strap 20 may be slidably coupled to a section of the leader portion 22. Each of the restraint straps 16, 18 and 20 may comprise a generally flexible material such as a cloth webbing or leather material.

A pair of side straps 24 may be provided for coupling each of the restraint straps 16, 18 and 20 together. Each of the side straps 24 may be coupled to and extending between each of the restraint straps 16, 18, and 20. Each of the side straps may comprise a generally flexible material such as a cloth webbing or leather material.

A pair of coupling members 26 may be provided for coupling each of the ends 13 and 14 of the upper 16 and lower 18 restraint straps together. Each of the coupling members 26 may include a first coupling portion 27 coupled to one of the ends 13 or 14 of the upper 16 and lower 18 restraint straps and a second coupling portion 28 coupled to one of the ends 13 or 14 of the upper 16 and lower 18 restraint straps. The first 27 and second 28 coupling portions may be releasably coupled together to make positioning the pet restraining harness 10 on the pet easier. Each of the coupling members 26 may comprise a buckle and a prong with the prong being removably insertable into the buckle. The coupling members 26 may provide for adjustably restricting the upper 16 and lower 18 restraint straps about the pet which would allow the pet restraining harness 10 to be utilized for pets of various sizes.

A fastening member 30 may be provided, as particularly illustrated in FIG. 2, for fastening the first end 13 of the intermediate restraint strap 20 to the leader portion 22 of the intermediate restraint strap 20 such that the intermediate restraint strap 20 is adjustably restrictable about the body of the pet. The fastening member 30 may comprise any type of fastening member capable of fastening the first end 13 of the intermediate restraint strap 20 to a section of the leader portion 22, such as, for example, a buckle.

A securing member 32 is mounted to the second end 14 of the intermediate restraint strap 20 for securing the pet restraining harness 10 to the seat belt of the vehicle. In one embodiment of the present invention, the securing member 32 is releasably securable to the buckle of the seat belt in the vehicle for restraining movement of the pet within the vehicle.

In use, the pet restraining harness 10 is positioned around the body of the pet. The fastening member 30 is adjusted to fit around the body of the pet. The securing member 32 on the end of the leader portion 22 is inserted in the buckle of the seat belt restricting movement of the pet around an interior of the vehicle and during an accident.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A harness system for restraining a pet in a vehicle having a seat belt with a seat belt buckle, said system comprising:

a restraint assembly including a plurality of restraint straps removably couplable to a body portion of the pet and releasably couplable to the seat belt of the vehicle, each of said restraint straps having a first end and a second end being releasably couplable to each other such that each of said restraint straps forms a loop having a hole when said ends of each of said restraint straps are releasably coupled together, each of said holes of said loops being in registration with each other when said ends of each of said restraint straps are releasably coupled together, said plurality of restraint straps including:

an upper restraint strap being positionable about the body of the pet and positionable adjacent to a pair of fore legs of the pet;

a lower restraint strap being positionable about the body of the pet and positionable adjacent to a pair of hind legs of the pet;

an intermediate restraint strap being positionable about the body of the pet and positionable at a location between said upper and lower restraint straps on the body of the pet, said second end of said intermediate restraint strap extending beyond said first end of said intermediate restraint strap defining a leader portion of said intermediate restraint strap, said first end of said intermediate restraint strap being slidably coupled to said leader portion of said intermediate restraint strap;

a pair of side straps for coupling each of said restraint straps together, each of said side straps being coupled to and extending between each of said restraint straps;

a pair of coupling members for coupling each of said ends of said upper and lower restraint straps together, each of said pair of coupling members having a first coupling portion coupled to said second ends of said upper and lower restraint straps and a second coupling portion coupled to said first ends of said upper and lower restraint straps, said first and second coupling portions being releasably coupled together, each of said pair of coupling members comprising a buckle and a prong;

a fastening member for fastening said first end of said intermediate restraint strap to said leader portion of said intermediate restraint strap such that said intermediate restraint strap is adjustably restrictable about the body of the pet, said fastening member comprising a buckle; and a securing member being mounted to said second end of said intermediate restraint strap such that said leader portion of said intermediate restraint strap is releasably securable to the buckle of the seat belt in the vehicle for restraining movement of the pet, said securing member comprising a buckle.

* * * * *